UNITED STATES PATENT OFFICE.

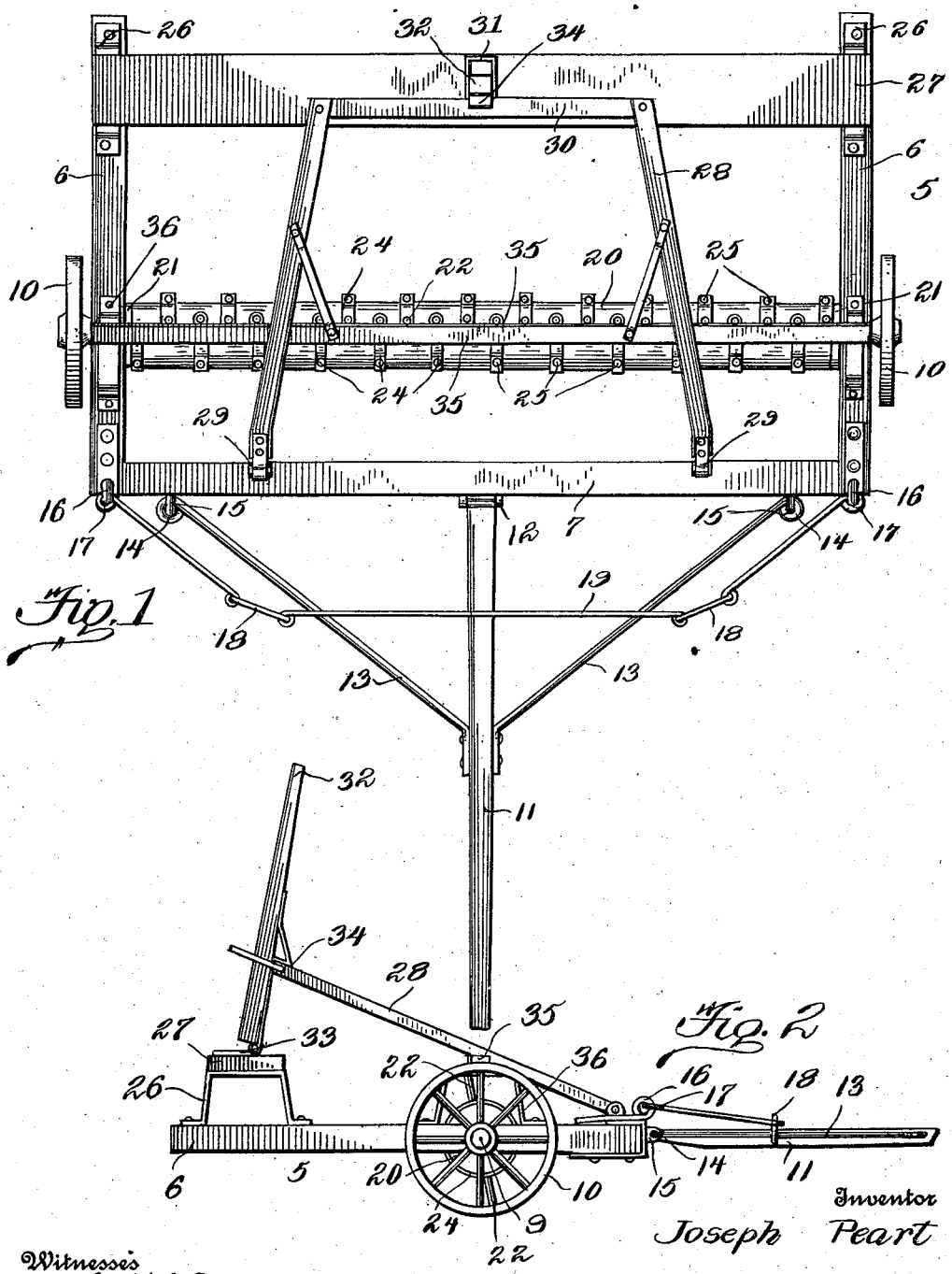

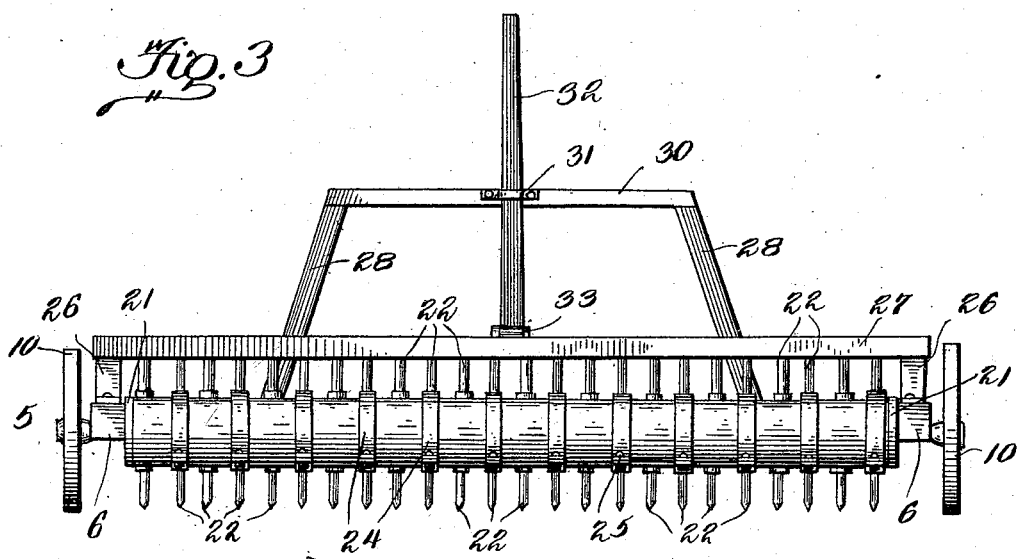
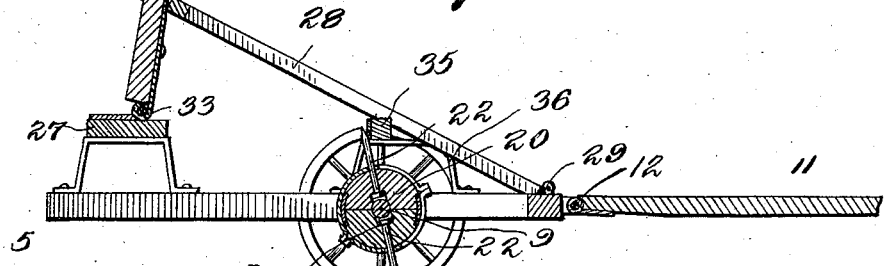
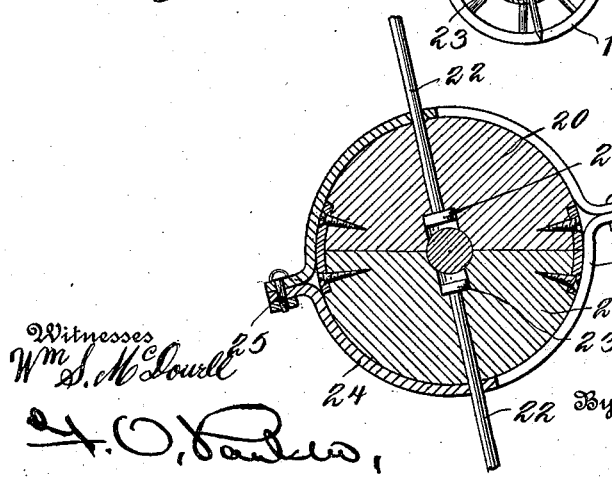

JOSEPH PEART, OF VERNON, UTAH, ASSIGNOR OF ONE-HALF TO CHARLES H. SKIDMORE, OF LOGAN, UTAH.

RAKE.

1,010,310.   Specification of Letters Patent.   Patented Nov. 28, 1911.

Application filed September 23, 1910. Serial No. 583,486.

*To all whom it may concern:*

Be it known that I, JOSEPH PEART, a citizen of the United States, residing at Vernon, in the county of Tooele and State of Utah, have invented new and useful Improvements in Rakes, of which the following is a specification.

The invention relates to a farming machine and more particularly to the class of rakes.

The primary object of the invention is the provision of a rake in which sage plants, hay, straw, or other like material may be gathered into piles in a field during the advancement of the same therethrough.

Another object of the invention is the provision of a rake in which the raking member will be held in position for gathering material from the ground and which may be liberated on the accumulation of a load thereby discharging the same while the machine is in motion or, in other words, during its travel.

A further object of the invention is the provision of a machine of this character that can travel from one point to another and which is of simple construction, reliable and efficient in operation and inexpensive in manufacture.

With these and other objects in view, the invention consists in the construction, combination and arrangement of parts hereinafter fully described, illustrated in the accompanying drawings and pointed out in the claims hereunto annexed.

In the drawings:—Figure 1 is a top plan view of a rake constructed in accordance with the invention. Fig. 2 is a side elevation thereof. Fig. 3 is a rear elevation. Fig. 4 is a vertical longitudinal sectional view on the line 4—4 of Fig. 1. Fig. 5 is an enlarged transverse sectional view through the rotatable rake element.

Similar reference characters are employed to designate corresponding parts in the several views.

Referring to the drawings by numerals, 5 designates the frame of the rake including side beams 6 and a front cross connecting beam 7, the same being united to the side beams in any suitable manner. Journaled in the side beams 6 is a rotatable shaft 9, the outer ends of which protrude a distance beyond the opposite sides of the frame and on which are supported ground or traction wheels 10, the latter being of the ordinary well-known construction.

Extending forwardly at a medial point from the front cross beam 7 is a draft tongue or pole 11 the rear end of which is connected to the side beam 7 by means of a pivot 12, the pole or draft beam 11 being braced by rearwardly diverging brace rods 13 each secured at its forward end to the said tongue and at its opposite end to the front beam, the ends of said rods 13 connected with the front cross beam being provided with an eye 14, the same being rigidly connected with a similar eye 15 mounted in the said front cross beam so as to permit the vertical swinging of the draft pole or tongue during the travel of the machine.

Secured to the forward corners of the frame 5 are eye clips 16 with which are loosely engaged links 17 the latter being also loosely engaged with rings 18, the latter being joined by a cross rod 19 and to these rings and the rod 19 are adapted to be connected the traces, (not shown) of the harness or draft animals when hitched to the pole.

Fixed to the shaft 9 between the side beams 6 of the frame is a rotatable rake element comprising a roller formed of separable semi-cylindrical sections 20, the latter being securely fastened about the shaft 7 by means of clamping rings 21 fixed about opposite ends of the said roller. Each section of the roller has driven therein a row of spaced rake tines or teeth 22, the same being provided at their inner ends with heads 23 which latter engage in suitable counterseats formed in the inner faces of the said sections. As stated, these teeth or tines 22 are arranged in rows at diametrically opposite points of the rollers so that when one row is positioned substantially vertical with respect to the ground it will gather material therefrom during the advancement of the machine, while the other row will be inactive and raised from the ground. Arranged alternately on opposite sides of the roller are split clamping members 24, the latter including two sections adjustably connected together by means of an adjusted screw 25, the sections of each member near their outer ends being provided with openings through which are passed the tines 22 at diametrically opposite points of the roller and these clamping members serve to prevent the bending of the said tines when in position for gathering a load from the ground.

Rising from the rear end of the side beams of the frame are inverted U-shaped brackets 26 upon which is fixed a platform or deck 27, the latter being disposed transversely of the frame and is adapted to be occupied by a teamster. Connected to the front cross beam 7 of the frame is a substantially U-shaped swinging yoke 28, the ends of which are hinged as at 29 to the said front beam and a cross connecting bar 30 thereof is provided with a guide loop 31 through which is passed a locking lever 32 the lower end of which is connected by means of a hinge 33 to the platform or deck 27 and this lever has fixed thereon and projecting forwardly at a predetermined point a nose 34 the latter being adapted to lock the yoke against movement, the guide loop 31 being of a size to permit the lever to be swung whereby the said nose 34 will be out of the path of movement of the said yoke so that the yoke may be raised for a purpose as will be hereinafter more fully described.

Fixed transversely to the yoke 28 is a cross bar 35 which latter is adapted to be swung into and out of the path of movement of the tines or teeth 22 on the latter element, so that when the said bar 35 is in engagement with one row of tines or teeth the other row of said tines or teeth will be in a position for gathering material from the ground. Upon the raising of the yoke to bring the bar 35 out of engagement with the said row of teeth the rake element will automatically rotate whereby the load gathered by the other row of teeth will be discharged upon the ground as the machine is being advanced through a field.

Rising from the side beams and arranged in the path of movement of the cross bar 35 are rests or bearing brackets 36 upon which is adapted to normally rest the said cross bar 35 when in position for engagement with a row of the teeth or tines 22 for locking the said rake element against rotation whereby it will gather material from the ground.

In operation, the machine is pulled or drawn through a field and during the travel thereof the said rake element is locked against rotation so that one row of teeth or tines thereon will be positioned relative to the ground whereby the said teeth or tines will gather material upon the ground. After a predetermined amount of material has been gathered by the said teeth the yoke is unlocked by moving the lever whereby its nose will disengage from the cross bar 29 of the yoke, whereupon the said yoke is free to be lifted to move the bar 35 to free the rake element so that it may freely rotate thereby discharging the load of material accumulated by the same. This operation is repeated until the severed crop has been gathered into piles spaced from each other in the field.

What is claimed, is:—

1. In a rake, a frame, a rotatable shaft journaled on said frame, supporting wheels journaled at opposite ends of said shaft, a roller loosely mounted upon said shaft within the frame and having oppositely extending rake teeth, a yoke member pivoted to the frame, a cross bar fixed to the yoke member to swing into and out of the path of movement of the rake teeth on the lowering and raising of the yoke frame, inverted U-shaped brackets fixed to the frame and on which is adapted to rest the cross bar when in lowered position, and a swinging lever connected with the frame rearwardly of the yoke member and having means for engagement with the latter to lock the same against rising movement.

2. In a rake, a frame, a rotatable shaft journaled on said frame, supporting wheels journaled on opposite ends of the said shaft, a roller loosely mounted upon said shaft and having separable sections, clips surrounding the sections to hold the same about the shaft, the said sections being provided with counter seats formed in their inner adjacent faces, and rake tines driven through the sections and having heads engaging in the counter seats, and swinging means pivoted to the frame and movable into and out of the path of the tines.

3. In a rake, a frame, a rotatable shaft journaled on said frame, supporting wheels journaled on opposite ends of the said shaft, a roller loosely mounted upon said shaft and having separable sections, clips surrounding the sections to hold the same about the shaft, the said sections being provided with counter seats formed in their inner adjacent faces, rake tines driven through the sections and having heads engaging in the counter seats, swinging means pivoted to the frame and movable into and out of the path of the tines, and a lever pivotally connected rearwardly of the said swinging means and engageable therewith to normally sustain the same in position for engagement with the uppermost tine, whereby the lowermost tine will be held in working relation to the ground.

In testimony whereof I affix my signature in presence of two witnesses.

JOSEPH PEART.

Witnesses:
L. L. BAKER,
J. M. SHIELDS.

Copies of this patent may be obtained for five cents each, by addressing the "Commissioner of Patents, Washington, D. C."